Jan. 1, 1946. J. A. MARKSTRUM 2,392,172
BROACH
Filed July 22, 1942
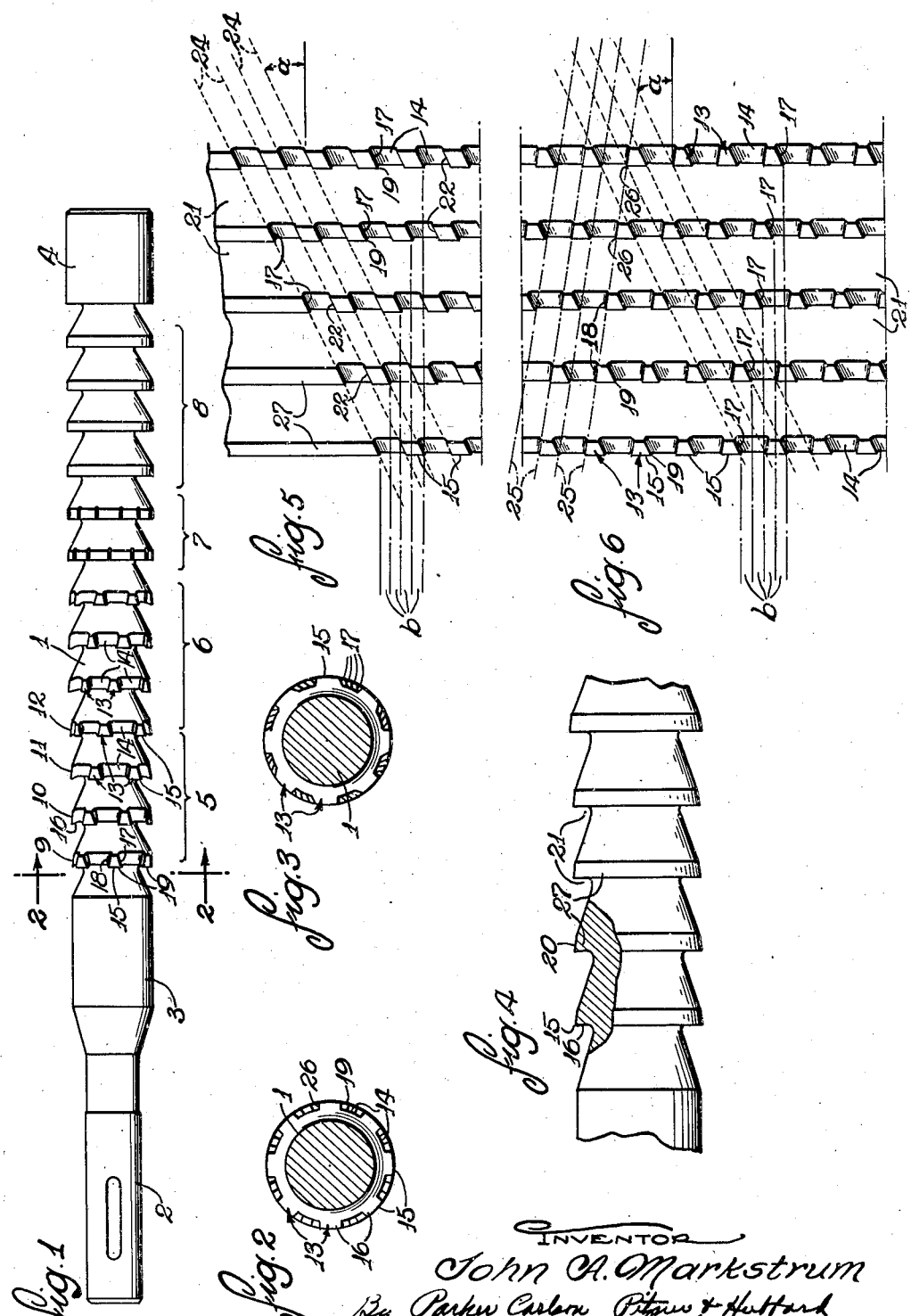

Patented Jan. 1, 1946

2,392,172

UNITED STATES PATENT OFFICE 2,392,172

BROACH

John A. Markstrum, Detroit, Mich., assignor to Ex-Cell-O Corporation, Detroit, Mich., a corporation of Michigan Application July 22, 1942, Serial No. 451,823

6 Claims. (Cl. 29—95.1)

The present invention relates to broaches for removing stock from external and internal surfaces of various shapes.

One of the objects of the invention is to provide a progressive broach which is simple in construction and economical to produce.

Other objects and advantages will become apparent as the description proceeds.

In the accompanying drawing:

Figure 1 is a side elevational view of a broach embodying the features of my invention.

Fig. 2 is a section taken along the line 2—2 of Fig. 1.

Fig. 3 is a similar section illustrating a different tooth form.

Fig. 4 is a fragmentary elevational view illustrating the first step in the method of producing the broach.

Fig. 5 is a fragmentary development view illustrating the second step.

Fig. 6 is a fragmentary development view of the finished broach illustrating the final step of the method.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Refering more particularly to the drawing, the invention is adaptable to various types and forms of broaches for removing metal from internal and external surfaces of different shapes. For example, the broach may be of a circular form for removing stock from bores and other internal surfaces, or may be of a flat form for removing stock from external surfaces.

The internal broach shown in the drawing to illustrate the invention comprises an elongated body 1 having a coupling member 2 at one end for connection to the actuator of a broaching machine (not shown) in a conventional manner. The body 1 is formed adjacent the coupling member 2 with a leading cylindrical pilot section 3, and at the other end with a trailing pilot section 4. In the specific form shown, the body 1 is formed between the pilot sections 3 and 4 and in the order stated from the leading toward the trailing end with a plurality of peripheral cutting sections, namely, a first roughing section 5, a second roughing section 6 of greater cutting radius than the first section, a semi-finishing section 7, and a finishing section 8.

The present invention relates primarily to the structure and method of making the roughing sections 5 and 6, each of which comprises a series of annular rows of teeth of similar form but respectively of different radial height. In the present instance, the first roughing section 5 has four rows 9, 10, 11, and 12 of uniform height, and the second roughing section 6 has three trailing rows of uniform but greater height than the teeth of the first section.

The teeth 13 of each row 9 to 12 are peripherally spaced uniformly and separated by interdental spaces 14. Each tooth has an outer cutting edge 15 of arcuate shape, a front or cutting face 16 and relieved side flanks 17 and 18, the former constituting the clearance face for a side cutting edge 19 formed by the intersection of this flank and the front face 16. This edge may be square as shown in Figs. 1, 2, and 6 or beveled as shown in Fig. 3.

The corresponding teeth 13 of the successive rows 9 to 12 are helically alined along the body 1 of the broach so that each trailing tooth is peripherally offset to a predetermined extent with respect to the immediate leading tooth determining the width of the chip to be removed from the work. It will be understood that each tooth of the row 9 will form a spline groove in the bottom of the workpiece and that the helically alined teeth of the succeeding rows 10, 11, and 12 will successively remove a series of work chips from one side of the initial spline rib. The number of rows of teeth is determined by the number of chips required to completely remove the spline.

To enable the teeth to be formed economically in accordance with the improved method, the side flanks 17 of the teeth 13 in each helically extending row lie on a common surface which extends at an angle $a$ to the axial line of feed of the broach. The surfaces 17 of the different rows of flanks are indicated by one of the dotted lines in Fig. 6. The magnitude of the angle $a$ determines the amount of angular offset $b$ of the successive flanks 17 in each helical row, this being influenced by the axial spacing of the successive rows 9 to 12 and the angular spacing of the teeth in each row. Accordingly, the angle is correlated with these factors to produce the chip width desired for given work and cutting materials. As shown, the angle $a$ is 27 degrees.

After the preliminary steps of machining the body 1 to define the cutting edges 15, the outer or clearance faces 20 of the teeth and cutting chip clearance grooves 21, the flanks 17 are formed in accordance with the present method simply by milling and then finishing helical grooves in the body. As shown by the dotted lines 24 in Fig. 5, the grooves are preferably of a width determined by the angular spacing of the teeth 13 in each annular row, and one side wall of the groove 24 is contoured according to the desired shape of cutting edges 19 and the flanks 17 which are of course finished by grinding in the usual way. If rectangular chips are to be removed by each tooth, the flanks and the side cutting edges 19 are disposed at right angles to the outer cutting edges 15. Or, in order to increase the life of the edges 19, the latter may be beveled as shown in Fig. 3, the cutter forming these edges being contoured correspondingly.

As a result of the grooving operation, faces 22 are formed on the other sides of the teeth, these being contoured according to the shape of the grooving tool. They extend parallel to the clearance flanks 17 and therefore must be cut away at least on the teeth in the first row 9. Inasmuch as the teeth of this row, which are the first to cut, may wear down in service more rapidly than the teeth subsequently acting, it is desirable to relieve the non-cutting sides of all of the teeth of each series thereby avoiding any possible interference as well as the necessity of forming the roughing teeth of precisely uniform height. The preferred way of accomplishing this is by forming a second series of longitudinal grooves 25 indicated by the dot-dash lines in Fig. 6 and extending diagonally of the direction of feed so as to intersect the first grooves 24. The helix angle of the second grooves 25, about 8 degrees in the present instance, is determined automatically by the intersections 26 of the front tooth faces 16 with the first grooves 24. In this way, the side flanks 18 are formed on all of the teeth 13, which, being inclined opposite to the flanks 17, are relieved properly relative to the edges 26 which on the teeth of the first row 9 perform a cutting function.

With the teeth thus shaped and arranged, the construction of the broach is very economical. As illustrated in Fig. 4, the first steps are to form the chip clearance grooves 21 in the body 1 and shape the axially spaced ribs 27 thus formed to provide the clearance faces 20, and thus define the outer cutting edges 15. This may be accomplished by form cutters and grinding tools in ways well known in the art. Next, by form cutting, hobbing, or grinding, the parallel helically extending grooves 5 are cut across the ribs 27 to form the teeth 13 and define the side cutting edges 19 and the flanks 17, leaving the parallel surfaces 22 on the other sides of the teeth. The body is now contoured as shown in Fig. 5. Finally, the surfaces 22 are cut back at least on the teeth of the first row 9, and preferably a second grooving operation is performed along the dot-dash lines (Fig. 6) to form the relieved flanks 18 on all of the teeth 13.

It will be apparent that flat broaches may be formed in the same way. In such a case, the grooves 24 and 25 would preferably be straight, the method being the same as described above in all other respects.

I claim as my invention:

1. A broach comprising a body having spaced parallel ribs defining chip clearance grooves between them, said body having parallel grooves extending helically across said ribs and dividing the latter to form helically alined rows of teeth each having a side cutting edge, and said body having a second set of parallel helical grooves intersecting said second mentioned grooves between said teeth.

2. A broach having teeth arranged in a plurality of parallel transverse rows with the teeth of each row spaced apart and with the teeth of successive rows alined longitudinally but diagonally of the direction of feed of the broach, one side surface of the teeth of each of said diagonal rows lying on a common surface, and the other side surfaces of the teeth of each diagonal row lying on a common diagonally extending surface intersecting said first surface.

3. A broach comprising a body having a plurality of spaced transverse rows of spaced teeth, the corresponding teeth of the successive rows having alined sides lying on parallel surfaces extending diagonally of the direction of feed of the broach, and the teeth of successive diagonal rows being offset progressively from each other in said direction of feed whereby the progressively acting side cutting edges of said teeth are adapted to take overlapping cuts.

4. A broach comprising a body having a plurality of parallel transverse rows of spaced teeth with the corresponding teeth of the successive rows alined in a row extending longitudinally but diagonally of the direction of feed of the broach, the inclination of said diagonal rows being correlated with the spacing of said transverse rows and of the teeth therein whereby the teeth of the successively acting transverse rows are offset from but overlap each other.

5. A circular broach comprising an elongated generally circular body having a longitudinal series of uniformly axially spaced annular rows of uniformly peripherally spaced teeth, the corresponding teeth of the successive annular rows being arranged in helical rows extending longitudinally along but diagonally of the axis of said body whereby each trailing tooth of each helical row is peripherally offset in relation to the immediately preceding tooth to present one side surface in exposed cutting position, said side surfaces of the teeth of each helical row lying in a common helicoidal surface, the opposite side surfaces of the teeth of each helical row lying in a common surface intersecting said helicoidal surface.

6. A circular broach comprising an elongated generally circular body having a longitudinal series of uniformly axially spaced annular rows of uniformly peripherally spaced teeth, the corresponding teeth of the successive annular rows being arranged in helical rows extending longitudinally along but diagonally of the axis of said body whereby each trailing tooth of each helical row is peripherally offset in relation to the immediately preceding tooth to present one side surface in exposed cutting position, said side surfaces of the teeth of each helical row lying in a common helicoidal surface, the opposite side surfaces of the teeth of each helical row lying in a common surface intersecting said helicoidal surface, the teeth of a predetermined number of leading annular rows being of uniform radial height, the teeth of a predetermined number of trailing annular rows being of uniform height greater than said first mentioned height.

JOHN A. MARKSTRUM.